United States Patent
Majila et al.

(10) Patent No.: US 12,126,521 B2
(45) Date of Patent: Oct. 22, 2024

(54) POLICY ENFORCEMENT ON MULTI-DESTINATION PACKETS IN A DISTRIBUTED TUNNEL FABRIC

(71) Applicant: Hewlett Packard Enterprise Development LP, Houston, TX (US)

(72) Inventors: Rajib Majila, Bangalore (IN); Venkatavaradhan Devarajan, Bangalore (IN); Vinayak Joshi, Bangalore (IN); Ram Iakhan Patel, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 171 days.

(21) Appl. No.: 17/411,875

(22) Filed: Aug. 25, 2021

(65) Prior Publication Data

US 2023/0069306 A1 Mar. 2, 2023

(51) Int. Cl.
*H04L 45/16* (2022.01)
*H04L 12/46* (2006.01)
*H04L 45/30* (2022.01)
*H04L 45/42* (2022.01)

(52) U.S. Cl.
CPC .......... *H04L 45/16* (2013.01); *H04L 12/4633* (2013.01); *H04L 45/30* (2013.01); *H04L 45/42* (2013.01)

(58) Field of Classification Search
CPC ..... H04L 45/16; H04L 12/4633; H04L 45/30; H04L 45/42
See application file for complete search history.

(56) References Cited

U.S. PATENT DOCUMENTS

| | | | | |
|---|---|---|---|---|
| 7,031,297 B1* | 4/2006 | Shabtay | ................. | H04L 49/35 370/352 |
| 9,173,073 B2* | 10/2015 | Marocchi | ................ | H04W 4/08 |
| 10,993,088 B1* | 4/2021 | O'Gwynn | ............... | H04W 4/08 |
| 2015/0163158 A1* | 6/2015 | Ryland | .................... | H04L 63/20 709/225 |
| 2015/0188949 A1* | 7/2015 | Mahaffey | ............ | H04L 41/0894 726/1 |
| 2015/0195137 A1* | 7/2015 | Kashyap | ............. | H04L 41/0893 370/254 |
| 2019/0058651 A1* | 2/2019 | McDonald | .............. | H04L 45/44 |
| 2019/0215303 A1* | 7/2019 | Appala | .................... | H04L 12/46 |
| 2019/0245894 A1* | 8/2019 | Epple | ...................... | G06F 21/56 |
| 2021/0218684 A1* | 7/2021 | Rekhate | ............. | H04L 47/2441 |

* cited by examiner

*Primary Examiner* — Chris Parry
*Assistant Examiner* — Dixon F Dabipi
(74) *Attorney, Agent, or Firm* — Park, Vaughan, Fleming & Dowler LLP

(57) ABSTRACT

A system for policy management in a switch is provided. During operation, the system can generate, from a first policy defined for the switch, a second policy. The first policy can indicate whether a type of traffic is allowed from a source role to a destination role via an overlay tunnel. The second policy can indicate a plurality of destination roles that are allowed to receive multi-destination packets of the type of traffic from the source role via the overlay tunnel. Upon identifying a host associated with a role at a port of the switch, the system can determine whether the role belongs to the plurality of destination roles based on the second policy. If the role belongs to the plurality of allowed destination roles, the system can allow the port to forward a multi-destination packet, which is received via the overlay tunnel and associated with the type of traffic.

20 Claims, 11 Drawing Sheets

POLICY ENFORCEMENT ON MULTI-DESTINATION PACKETS IN A DISTRIBUTED TUNNEL FABRIC

BACKGROUND

Field

The present disclosure relates to communication networks. More specifically, the present disclosure relates to a method and system for efficient policy enforcement on multi-destination packets in a distributed tunnel fabric.

BRIEF DESCRIPTION OF THE FIGURES

In the figures, like reference numerals refer to the same figure elements.

DETAILED DESCRIPTION

Figure 1:
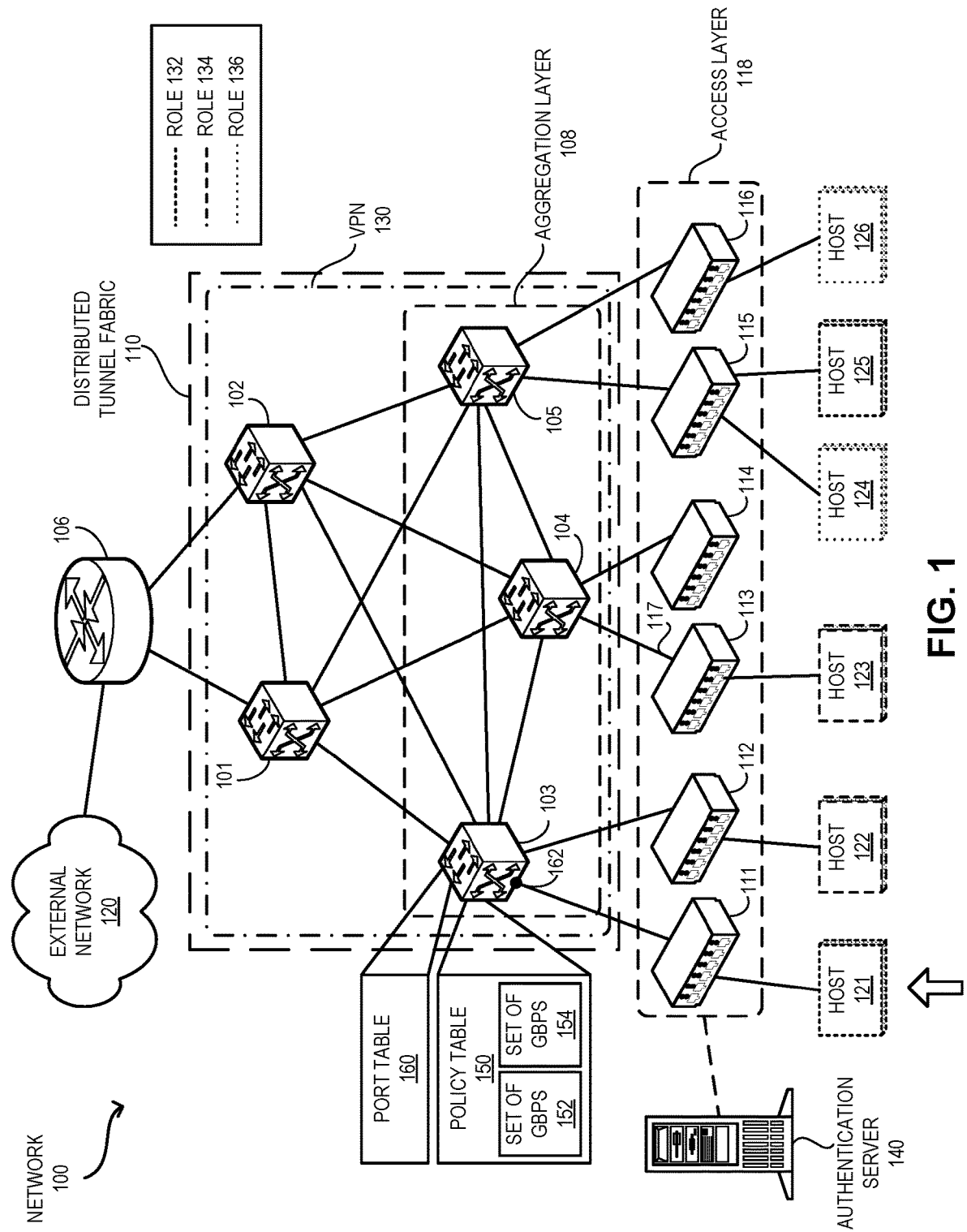
FIG. 1 illustrates an example of a network facilitating efficient policy enforcement on multi-destination packets, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

Internet is the delivery medium for a variety of applications running on physical and virtual devices. Such applications have brought with them an increasing traffic demand. As a result, equipment vendors race to build switches with versatile capabilities. To do so, a switch may support different protocols and services. For example, the switch can support tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs).

To deploy a VPN over the tunnels, a respective tunnel endpoint may map a respective client virtual local area network (VLAN) to a corresponding tunnel network identifier (TNI), which can identify a virtual network for a tunnel. The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if the layer-3 routing and forwarding are needed.

The VPN can be deployed over tunnels formed among the backbone (or non-access) switches of a network. For example, if a network includes core, aggregation, and access switches, the core and aggregation switches of the network can be referred to as the backbone switches. The set tunnels among the backbone switches can form an overlay tunnel fabric. In other words, the backbone switches of the tunnel fabric can operate as the tunnel endpoints and facilitate routing over the tunnels. On the other hand, the access switches receive the packets from hosts (or client devices) and facilitate the packet distribution underlay. Since a VPN can be distributed across the tunnel fabric, a VPN over the tunnel fabric can also be referred to as a distributed tunnel fabric.

One aspect of the present technology can provide a system for policy management in a switch. During operation, the system can generate, from a first policy defined for the switch, a second policy. The first policy can indicate whether a type of traffic is allowed from a source role to a destination role via an overlay tunnel. On the other hand, the second policy can indicate a plurality of destination roles that are allowed to receive multi-destination packets of the type of traffic from the source role via the overlay tunnel. Upon identifying a host associated with a role at a port of the switch, the system can determine whether the role belongs to the plurality of destination roles based on the second policy. Subsequently, if the role belongs to the plurality of allowed destination roles, the system can allow the port to forward a multi-destination packet associated with the type of traffic. The multi-destination packet is received at the switch via the overlay tunnel.

In a variation on this aspect, if the role does not belong to the plurality of allowed destination roles, the system can refrain from changing a forwarding policy for the port for the class of traffic.

In a variation on this aspect, the system can allocate a filter identifier for the plurality of allowed destination roles.

The filter identifier can uniquely identify the plurality of allowed destination roles in the second policy.

In a further variation, the system can determine whether the role belongs to the plurality of allowed destination roles can by determining whether the role of the host corresponds to the filter identifier.

In a further variation, the system can maintain a data structure that maps the filter identifier to the plurality of allowed destination roles.

In a variation on this aspect, upon receiving a packet from the host, the system can determine whether the packet belongs to multi-destination traffic. Moreover, if the packet belongs to multi-destination traffic, the system can determine whether to allow the port to forward the packet based on the class of traffic.

In a further variation, if the packet does not belong to multi-destination traffic, the system can determine whether to forward the packet to a destination of the packet based on the first policy.

In a further variation, the system can determine a source role from a tunnel header encapsulating the packet and determine the second policy based on the source role and the class of traffic.

In a variation on this aspect, the switch can belong to an overlay tunnel fabric.

The aspects described herein solve the problem of enforcing access policies on multi-destination packets received from a tunnel by (i) synthesizing a set of policies indicating which destination roles are allowed to receive a class of traffic from a source role; (ii) representing each unique set of allowed destination roles based on a filter identifier; and (iii) upon detecting a host from a port, associating the port with the filter identifiers corresponding to the role of the host. This allows a switch to determine, for a source role of a multi-destination packet, one or more ports to which the packet should be forwarded.

Typically, hosts, which can be user or client devices, need to authenticate to connect to a VPN (e.g., based on an authentication process). Examples of hosts can include, but are not limited to, laptops, desktops, printers, cellphones, tablets, Internet of Things (IoT) devices, and appliances. With existing technologies, a host can be coupled to an access switch for accessing the fabric. The access switch can then authenticate the host from an authentication server based on the authentication process, such as port-based or username/password-based authentication. The port-based authentication can be based on the Institute of Electrical and Electronics Engineers (IEEE) 802.1X standard. Based on the successful authentication, the access switch can determine a host role and allocate a VLAN to the host based on the host role.

The host role may indicate the affiliation between the user of the host and the entity (e.g., an enterprise or organization) associated with the VPN. The host role can indicate one or more of: a department, a level of access, and a domain of communication). For example, if the host is associated with a user with administrative privilege, the corresponding host role can be an administrator role. On the other hand, if the host is associated with a guest user, the host role can be a guest role. By associating the host to a role, the host can be allocated to a group. A user (e.g., an administrator) can then configure group-based policies (GBPs) to facilitate the segmentation of traffic based on the role of the hosts as determined during the authentication process. GBP allows the administrator to configure policies that define permissible traffic patterns across roles.

Typically, a switch can maintain a set of GBPs based on the source and destination roles. The GBPs can indicate whether a class of traffic from a source role is allowed or permitted to be forwarded to a destination role. The role can then define the network access policies governing the host instead of the physical location of the host or the switch to which the host is connected. To enforce the GBPs, the source and destination roles, as well as some layer-3 and layer-4 parameters, of every packet need to be examined at the enforcement point. The enforcement point can be at the ingress switch, the egress switch, an intermediate switch, or a unified central enforcement point (e.g., a mobility controller gateway).

However, the egress switch is often chosen to be the enforcement point. The switch that can enforce GBPs can be referred to as a policy-enforcement switch. Since the egress switch can determine the destination role, the fabric may deploy the GBPs at the egress switches without distributing them across the fabric. Furthermore, an egress switch may only enable a policy associated with a role if a host with that role is detected at a local port. In this way, the egress switch can efficiently enforce GBPs in a fabric. Accordingly, an access switch can forward packets from a host to the fabric via the allocated VLAN upon successful authentication of the host.

Upon receiving the packet, an ingress aggregate switch can encapsulate the packet with a tunnel header, include the role of the source host (i.e., the source role) in the tunnel header, and forward the encapsulated packet via a corresponding tunnel. The egress switch, which can be the other tunnel endpoint, can obtain the source role and decapsulate the tunnel header to obtain the packet. Based on the destination address of the packet, the switch can determine the role of the destination host (i.e., the destination role). Based on the source and destination roles of the packet, the egress switch can traverse the GBPs to determine whether to forward the packet to the destination host. However, a multi-destination packet may be addressed to a multicast or broadcast address. Such a packet may not have a particular destination and a corresponding destination role. Consequently, determining whether to forward the packet to a local host based on GBPs can be challenging.

To solve this problem, a respective policy-enforcement switch can synthesize a new set of GBPs from the user-defined GBPs. Instead of indicating whether a class of traffic is permitted from a source role to a destination role, the new GBPs can indicate a set of destination roles that are permitted to receive the class of traffic from a source role. The switch can then use the synthesized GBPs to determine whether to forward multi-destination packets via a port based on the presence of a host belonging to the permitted role. To efficiently use the synthesized GBPs, the switch can generate a filter identifier and allocate the filter identifier to a respective unique set of destination roles permitted to receive traffic from at least one source role. The switch can then represent the sets of permitted destination roles based on the corresponding identifier.

When a new host with a role is detected at a port of the switch, the switch can determine which sets of destination roles include that role of the host. The switch can then associate the port with the identifiers of the determined sets of destination roles. For example, the switch can maintain a port table that maps a respective filter identifier to a set of corresponding ports. During operation, the switch can receive a packet via a tunnel. If the packet is a known unicast packet, the switch can use the user-defined GBPs to determine whether the packet can be forwarded to the destination address of the packet. The switch can determine whether a GBP is defined for the source and destination roles and the class of traffic of the packet. Upon finding the GBP, the switch can determine whether the GBP allows the destination role to receive the packet.

On the other hand, if the packet is a multi-destination packet, the switch can use the synthesized GBPs to determine a set of ports for forwarding the packet. Examples of a multi-destination packet include, but are not limited to, a broadcast packet, a multicast packet, and an unknown unicast packet. The switch can determine whether a GBP is defined for the source role and the class of traffic of the packet. Upon finding the GBP, the switch can determine the filter identifier of the GBP and determine which ports are associated with the filter identifier (e.g., from the port table of the switch). The switch can then forward the packet via the ports associated with the filter identifier. In this way, the switch can efficiently enforce the GBPs on multi-destination packets as an egress switch of a tunnel fabric.

In this disclosure, the term "switch" is used in a generic sense, and it can refer to any standalone or fabric switch operating in any network layer. "Switch" should not be interpreted as limiting aspects of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting aspects of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of a network facilitating efficient policy enforcement on multi-destination packets, in accordance with an aspect of the present application. A network 100 can include a number of switches and devices. Network 100 can be an Ethernet, InfiniBand, or other networks, and may use a corresponding communication protocol, such as Internet Protocol (IP), FibreChannel over Ethernet (FCoE), or other protocol. Network 100 can include a distributed tunnel fabric 110 comprising switches 101, 102, 103, 104, and 105. Switches 101 and 102 of fabric 110 can be coupled to a core switch 106. Fabric 110 can be coupled to an external network 120 via a switch 106 (e.g., a layer-3 router).

In FIG. 1, a respective link in fabric 110 can be a tunnel. Switches of fabric 110 may form a mesh of tunnels. Examples of a tunnel include, but are not limited to, VXLAN, Generic Routing Encapsulation (GRE), Network Virtualization using GRE (NVGRE), Generic Networking Virtualization Encapsulation (Geneve), Internet Protocol Security (IPsec). A VPN 130, such as an EVPN, can be deployed over fabric 110. Fabric 110 can include an aggregation layer 108 of aggregate switches 103, 104, and 105. A respective aggregate switch can aggregate traffic from one or more downstream access switches.

Furthermore, aggregate switches 103, 104, and 105 can be coupled to an access layer 118, which can include access switches 111, 112, 113, 114, 115, and 116. Access layer 118 can facilitate access to fabric 110 to a number hosts 122, 123, 124, 125, and 126. Examples of hosts can include, but are not limited to, laptops, desktops, printers, cellphones, tablets, IoT devices, and appliances. Access switch 115 can provide access coverage to hosts 124 and 125. Similarly, access switches 111, 112, 113, and 116 can provide access coverage to hosts 122, 123, and 126, respectively. In this example, access switches 113 and 114 can be coupled to aggregate switch 104 to forward traffic to fabric 110. Consequently, the packets forwarded by access switch 113 can enter fabric 110 via aggregate switch 104.

With existing technologies, when host 123 joins the coverage of access switch 113, access switch 113 can authenticate host 123 from an authentication server 140. The authentication of host 123 can be based on an authentication process supported by access layer 118. For example, the authentication process can be based on a port-based (e.g., IEEE 802.1X) or username/password-based authentication. If host 123 is successfully authenticated by authentication server 140, access switch 113 can determine a host role 134 of host 123 and allocate a VLAN to host 123 based on the host role. Host role 134 may be provided by authentication server 140 and can indicate the affiliation between the user of host 123 and the entity associated with VPN 130. Host role 134 can indicate one or more of: a department of a user of host 123, a level of access granted to the user, and a domain of communication for host 123.

For example, if host 123 is associated with a user with administrative privilege, role 134 can be an administrator role. On the other hand, if host 123 is associated with a guest user, role 134 can be a guest role. In the same way, corresponding access switches of access layer 118 can determine role 132 for host 125, role 134 for host 122, and role 136 for hosts 124 and 126. The roles can thus define policies for accessing and forwarding traffic in fabric 110 instead of the physical location of the hosts or switches. By associating host 123 to role 134, host 123 can be allocated to a group of hosts belonging to role 134. A host may be associated with one or more groups. A user (e.g., an administrator) can then configure GBPs for fabric 110 to facilitate segmentation of traffic based on roles 132, 134, and 136 as determined during the authentication process. GBP allows the administrator to configure policies that define permissible traffic patterns across roles 132, 134, and 136 in fabric 110.

In fabric 110, the GBPs can be deployed at the egress switches without distributing them across fabric 110. For example, for packets receives via tunnels, switch 103 can operate as a policy-enforcement switch and maintain a policy table 150 comprising a set of GBPs 152 defined based on the source and destination roles. In some examples, GBPs 152 can be user-defined. A respective policy in GBPs 152 can indicate whether a class of traffic from a source role is allowed or permitted to be forwarded to a destination role. For example, a GBP can indicate whether role 134 is permitted to receive Transmission Control Protocol (TCP) traffic from role 132 at port 80. Since switch 103 can as an egress switch for a packet received via a tunnel, switch 103 can determine the destination role for the packet. Furthermore, switch 103 may only enable a policy associated with a role if a host with that role is detected at a port of switch 103. In this way, switch 103 can efficiently enforce GBPs in fabric 110.

Upon successful authentication of host 125, host 125 can send a packet to host 122. Access switch 115 can receive the packet and forward it to fabric 110. Ingress switch 105 can receive the packet and determine the source role (i.e., role 132 of source host 125) associated with the packet. Switch 105 can also determine a TNI (e.g., a VNI) corresponding to the VLAN of the packet. Switch 105 can further determine a remote tunnel endpoint, such as switch 103, in fabric 110 based on the header information of the packet. Switch 105 can maintain a mapping between the VLAN and the TNI for determining the TNI. Switch 105 can then encapsulate the packet with a tunnel header with the TNI, a destination address corresponding to switch 103, and the source role. Subsequently, switch 105 can forward the encapsulated packet via the tunnel to switch 103. To identify switch 103 as the remote tunnel endpoint, switch 105 needs to participate in the routing process of VPN 130 based on the TNI. The participation can include sharing of routing information associated with the TNI with the rest of fabric 110.

Egress switch 103, which can be the other tunnel endpoint of the tunnel, can obtain the source role from the tunnel header and decapsulate the tunnel header to obtain the packet. Based on the destination address of the packet, switch 103 can determine the destination role (i.e., role 134 of destination host 122). Switch 103 can traverse GBPs 152 to determine whether the traffic class of the packet is permitted to be forwarded from role 132 to role 134. If permitted, switch 103 can forward the packet to host 122. Otherwise, switch 103 can refrain from forwarding the packet to host 122 and may drop the packet. However, a multi-destination packet may be addressed in such a way that switch 103 may not be able to determine a destination host. For example, the destination address of such a packet can be a multicast address, which does not indicate an individual destination host. As a result, the packet may not have a corresponding destination role. Consequently, determining whether to forward the packet to a local host based on GBPs can be challenging for switch 103.

To solve this problem, a respective policy-enforcement switch, such as switch 103, can synthesize a new set of GBPs 154 from GBPs 152. Instead of indicating whether a class of traffic is permitted from a source role to a destination role, a respective policy in GBPs 154 can indicate a set of destination roles that are permitted to receive a class of traffic from a source role. For example, a GBP can indicate a set of roles permitted to receive TCP traffic from role 132 at port 80. Switch 103 can then use GBPs 154 to determine whether to forward multi-destination packets via a port based on the presence of a host belonging to the permitted role. To efficiently use GBPs 154, switch 103 can generate a filter identifier and allocate the filter identifier to a respective unique set of destination roles permitted to receive traffic from at least one source role. Switch 103 can then represent the sets of permitted destination roles in GBPs 154 based on the corresponding identifier.

When a new host 121 with role 132 is detected at a port 162 of switch 103, switch 103 can determine which sets of permitted destination roles include role 132. Switch 103 can then associate port 162 with the filter identifiers of those roles. To store the association information, switch 103 can maintain a port table 160 that maps a respective filter identifier to a set of corresponding ports. During operation, switch 103 can receive a packet for host 121 from host 126 via a tunnel. If the packet is a known unicast packet, switch 103 can search GBPs 152 to determine whether a GBP is defined in policy table 150 for the corresponding class of traffic from role 136 to role 132. Upon finding the GBP, switch 103 can determine whether the GBP allows role 132 to receive the packet.

On the other hand, if the packet is a multi-destination packet, switch 103 can use GBPs 154 and port table 160 to determine a set of ports for forwarding the packet. Examples of a multi-destination packet include, but are not limited to, a broadcast packet, a multicast packet, and an unknown unicast packet. Switch 103 can determine whether a GBP is defined in policy table 150 for role 136 and the class of traffic of the packet. Upon finding the GBP, switch 103 can determine the filter identifier of the GBP and determine which ports are associated with the filter identifier from port table 160. Switch 103 can then forward the packet via the ports associated with the filter identifier. In this way, switch 103 can efficiently enforce GBPs 154 on multi-destination packets as an egress switch of fabric 110.

Figure 2A:
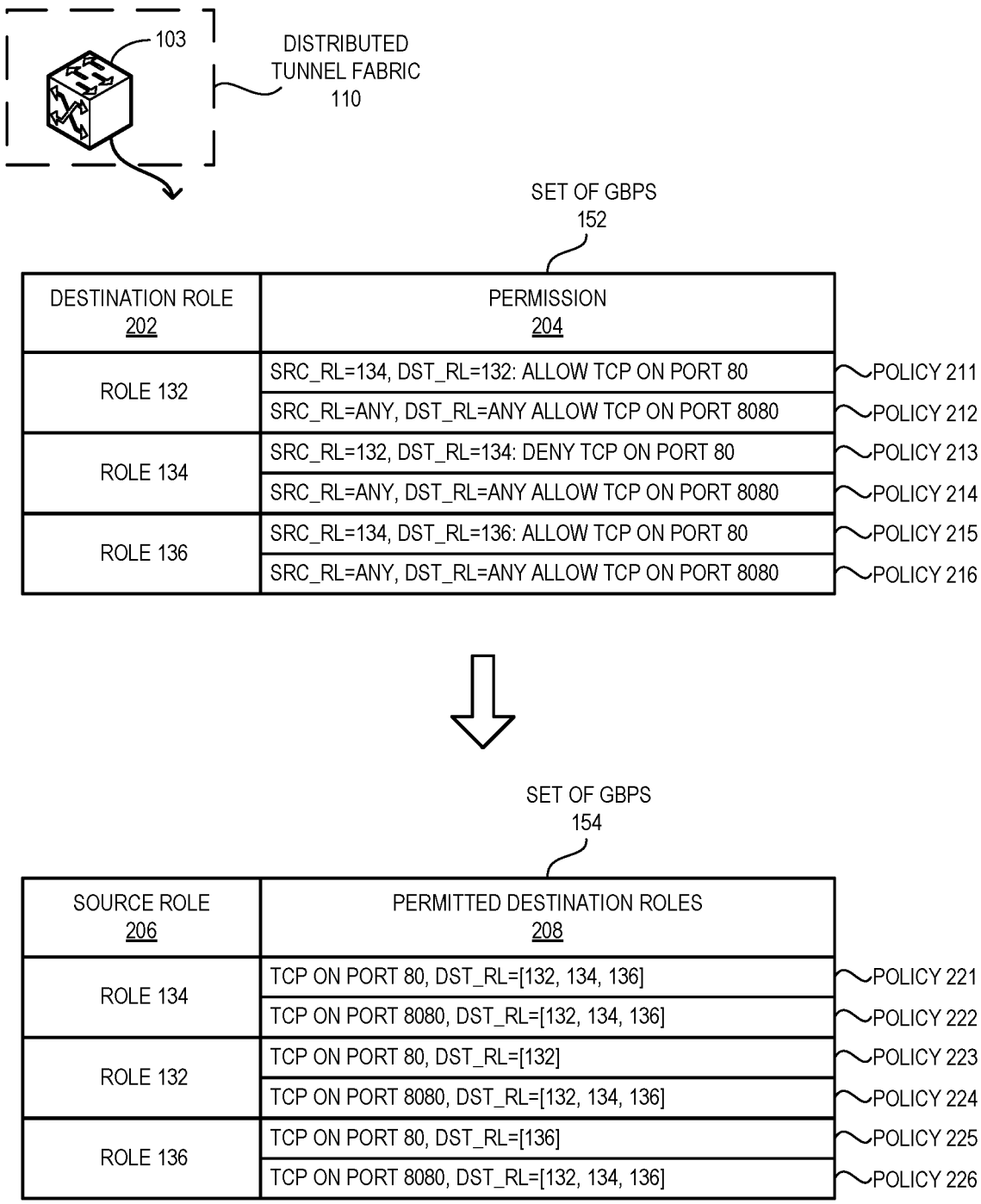
FIG. 2A illustrates examples of synthesis of policies for policy enforcement on multi-destination packets in a distributed tunnel fabric, in accordance with an aspect of the present application.

FIG. 2A illustrates examples of synthesis of policies for policy enforcement on multi-destination packets in a distributed tunnel fabric, in accordance with an aspect of the present application. A user may define GBPs 152 for switch 103. A respective policy in GBPs 152 can indicate a permission 204 for a destination role 202. In this example, GBPs 152 can include policies 211 and 212 for destination role 132, policies 213 and 214 for destination role 134, and policies 215 and 216 for destination role 136. Here, permission 204 of each of policies 211, 212, 213, 214, 215, and 216 can indicate whether a source role is permitted or allowed to receive a class of traffic. For example, policy 211 can indicate that TCP traffic on port 80 is permitted to travel from source role 132 to destination role 132. Similarly, policy 212 can indicate that TCP traffic on port 8080 is permitted to travel from any source role to any destination role, which can include destination role 132.

However, for multi-destination traffic, the destination role may not be known. Hence, GBPs 152 needs to be modified such that the policies can be applied based on a source role and corresponding traffic parameters (e.g., the class of traffic). Switch 103 can then synthesize GBPs 154 from GBPs 152. A respective policy in GBPs 154 can be based on a source role and agnostic of the destination role. Instead of providing an access permission for a class of traffic from a source role to a destination role, the policies of GBPs 154 can indicate a set of destination roles permitted to receive the class of traffic from a source role.

Accordingly, a respective policy in GBPs 154 can indicate a set of permitted destination roles 208 for a source role 206. In this example, GBPs 154 can include policies 221 and 222 for source role 134, policies 223 and 224 for destination role 132, and policies 225 and 226 for destination role 136. Here, permitted destination roles 208 of each of policies 221, 222, 223, 224, 225, and 226 can indicate which destination roles are permitted to receive a class of traffic from corresponding source role 206. For example, policy 221 can indicate that TCP traffic on port 80 is permitted to travel from source role 134 to destination roles 132, 134, and 136. Similarly, policy 222 can indicate that TCP traffic on port 8080 is permitted to travel from source role 134 to destination roles 132, 134, and 136.

To generate GBPs 154 from GBPs 152, switch 103 can reorganize the policies of GBPs 152 based on the source roles. Switch 103 can then determine the overlap among the reorganized roles for each source role. Subsequently, switch 103 can derive a preliminary set of policies by imploding the reorganized policies based on the overlap. In some examples, the implosion operation is based on a join operation. Subsequently, switch 103 can examine the validity of the preliminary set of policies based on the policies in GBPs 152. Switch 103 can eliminate the invalid policies from the preliminary set of policies and generate an intermediate set of policies. Switch 103 can then optimize the policies of the intermediate set by merging policies in such a way that the merged policies conform to the corresponding policies in GBPs 152. The optimized policies can be the policies of GBPs 154.

Figure 2B:
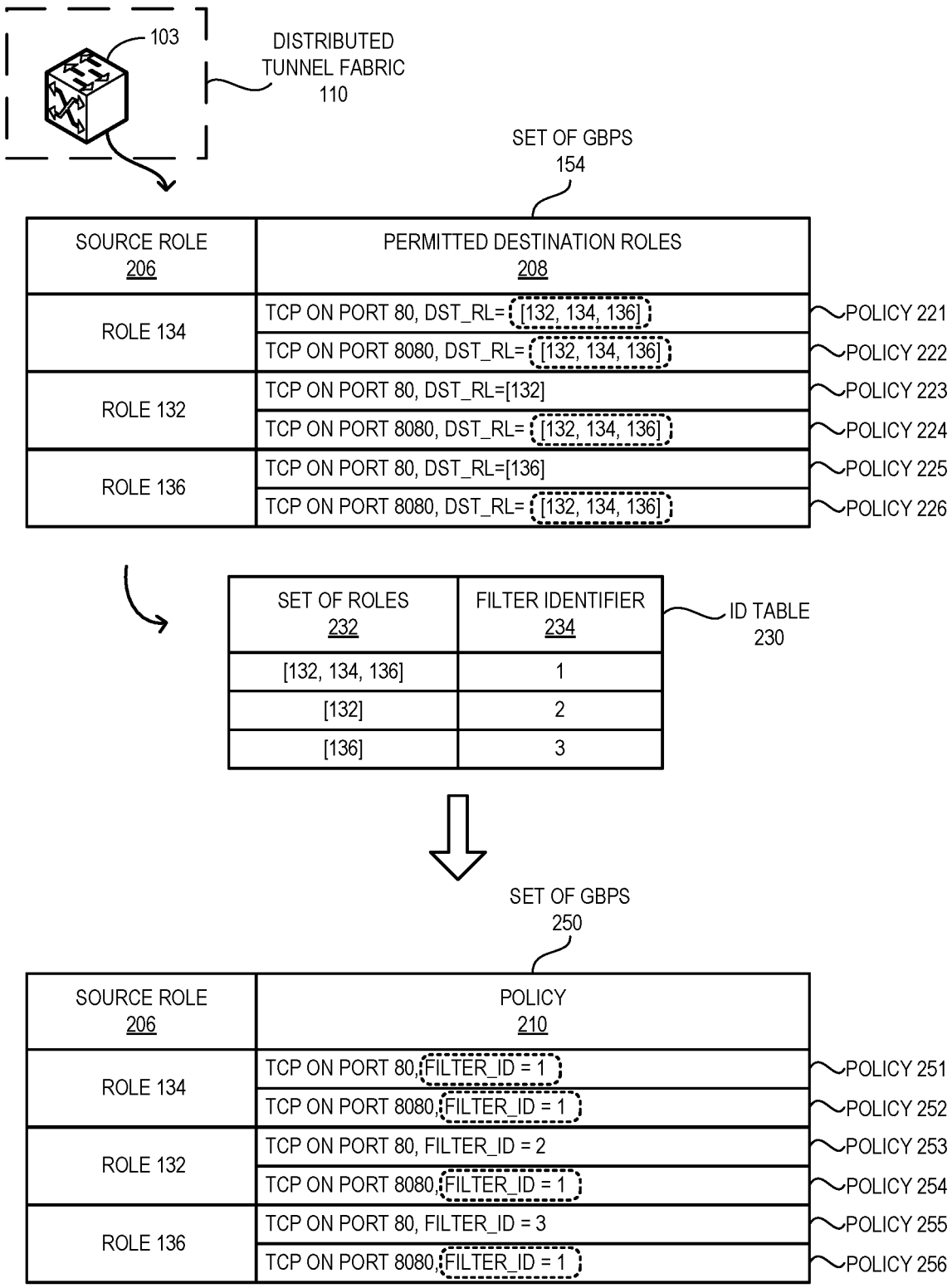
FIG. 2B illustrates an example of the generation of filter identifiers for policy enforcement on multi-destination packets in a distributed tunnel fabric, in accordance with an aspect of the present application.

FIG. 2B illustrates an example of the generation of filter identifiers for policy enforcement on multi-destination packets in a distributed tunnel fabric, in accordance with an aspect of the present application. By synthesizing GBPs 154 from GBPs 152, switch 103 can determine, for each source role, the set of permitted destination roles for each class of traffic. The same set of destination roles may be permitted to receive one or more classes of traffic from one or more source roles. To efficiently indicate the set of destination roles in GBPs 154, switch 103 can identify a respective unique set of destination roles appearing in at least one policy of GBPs 154. Switch 103 can then generate a filter identifier for the unique set of destination roles and allocate the filter identifier to it.

In some examples, switch 103 can generate the filter identifier based on an identifier generation mechanism supported by the application-specific integrated circuit (ASIC) of switch 103. For example, switch 103 can generate the filter identifier by incrementing a positive non-zero integer (e.g., on a register) for each unique set of destination roles. In GBPs 154, switch 103 can identify a unique set of destination roles [132, 134, 136] in policy 221. This unique set of destination roles can also appear in other policies, such as policies 222, 224, and 226. Switch 103 can then allocate a filter identifier "1" to the unique set of destination roles. In the same way, switch 103 can generate filter identifiers for other unique sets of destination roles in GBPs 154.

Switch 103 can maintain an identifier table 230 that maps a respective unique set of roles 232 to a corresponding filter identifier 234. Switch 103 can store the filter identifier in association with destination roles [132, 134, 136] in table 230. Similarly, switch 103 can store the other filter identifiers and their corresponding sets of unique destination roles in table 230. Switch 103 can represent a respective unique set of destination roles with the corresponding filter identifier, thereby generating an enhanced set of GBPs 250 from GBPs 154. For example, destination roles [132, 134, 136] of GBPs 154 can be represented using a filter identifier "1" in GBPs 250 (denoted with a dotted oval). GBPs 250 can include policies 251, 252, 253, 254, 255, and 256, which can be generated by representing the corresponding unique set of destination roles in policies 221, 222, 223, 224, 225, and 226, respectively.

Figure 3A:
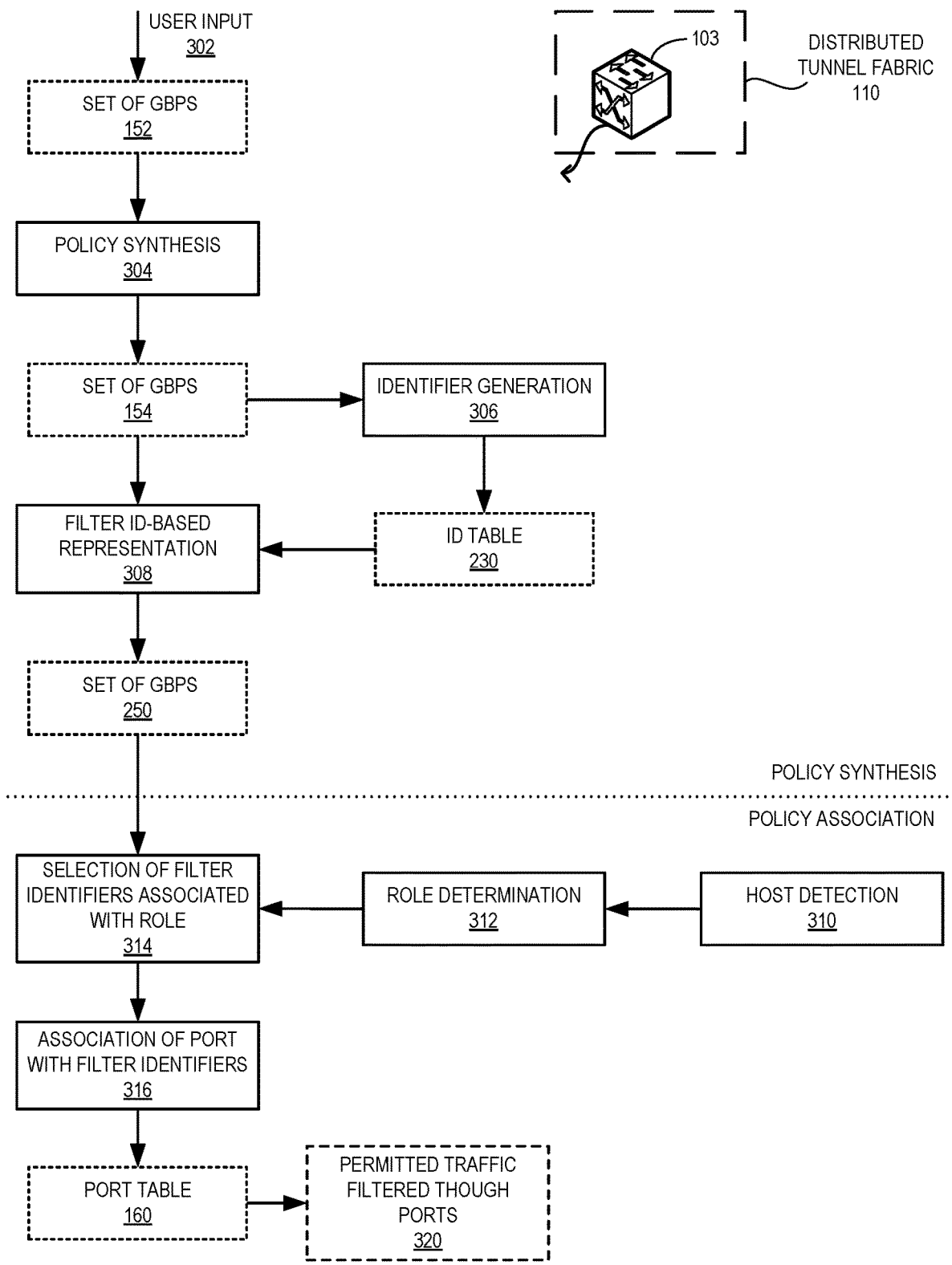
FIG. 3A illustrates an example of the policy management for multi-destination packets in a distributed tunnel fabric, in accordance with an aspect of the present application.

FIG. 3A illustrates an example of the policy management for multi-destination packets in a distributed tunnel fabric, in accordance with an aspect of the present application. The policy management process can include a policy synthesis phase that can generate policies for multi-destination packets. Subsequently, the policy management process can include a policy association phrase that can associate the ports of the switch with corresponding policies. Based on the association, switch 103 can enforce the generated policies on the multi-destination packets. The policy synthesis phase can occur during the initialization process for switch 103. Furthermore, during runtime, if switch 103 detects a new policy, switch 103 can reiterate the policy synthesis phase. In this way, switch 103 can dynamically adjust the enforcement of GBPs on multi-destination packets.

During the policy synthesis phase, a user (e.g., an administrator) can provide input to switch 103 to generate a set of GBPs 152 (operation 302). Subsequently, switch 103 can apply policy synthesis on set of GBPs 152 to generate a synthesized set of GBPs 154 (operation 304). For a respective unique set of destination roles in GBPs 154, switch 103 can generate a filter identifier (operation 306). Switch 103 can store the filter identifiers in an identifier table 230. Switch 103 can then represent a respective unique set of destination roles in GBPs 154 using the corresponding filter identifier (operation 308) and generate the enhanced set of GBPs 250.

During the policy association phase, switch 103 can detect a host via a local port (operation 310). Switch 103 may detect the host by receiving a first or initial packet from the host at the port. Switch 103 can then determine the role for the host (operation 312). Subsequently, switch 103 can select the filter identifiers associated with the role (operation 314) and associate the port with the selected filter identifiers (operation 316). Switch 103 can store the mapping between a filter identifier and the port in port table 160. Based on the entries in port table 160, switch 103 can filter the permitted traffic through the ports (operation 320).

Figure 3B:
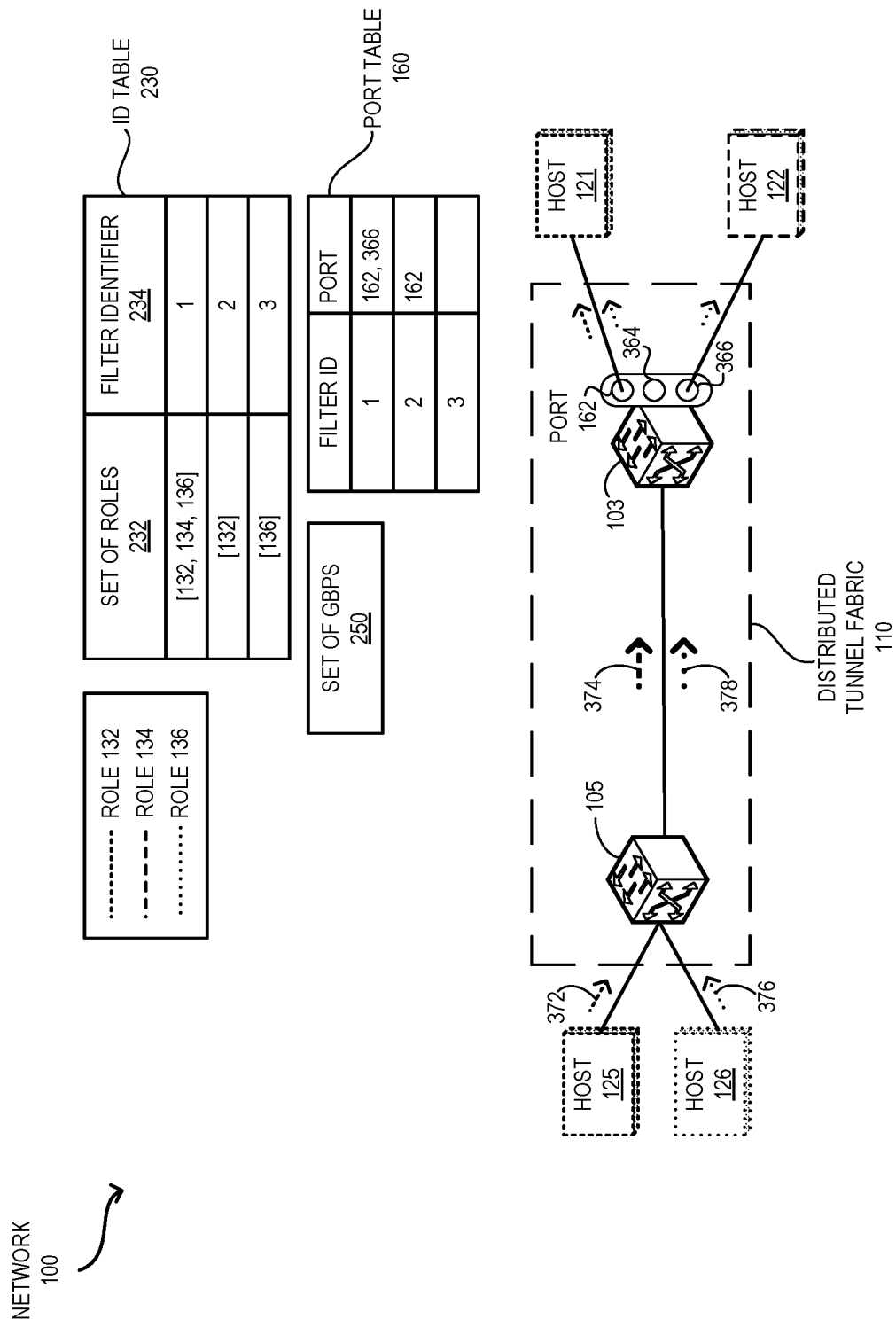
FIG. 3B illustrates an example of the policy enforcement on multi-destination packets in a distributed tunnel fabric based on synthesized policies, in accordance with an aspect of the present application.

Once the filter identifiers have been associated with the unique sets of destination roles in GBPs 154, switch 103 can associate the ports of switch 103 with corresponding filter identifiers. FIG. 3B illustrates an example of the policy enforcement on multi-destination packets in a distributed tunnel fabric based on synthesized policies, in accordance with an aspect of the present application. Suppose that switch 103 includes ports 162, 364, and 366. Hosts 121 and 122 can be coupled to ports 162 and 366, respectively. Upon generating GBPs 250, switch 103 can examine a respective port of switch 103 to determine whether the port is coupled to a host whose role is present in the set of permitted destination roles. If the presence of a role is detected, switch 103 can associate the corresponding filter identifier with the port.

For example, role 132 of host 121 can be present in the set of destination roles corresponding to filter identifiers "1" and "2." Hence, switch 103 can associate port 162 of host 121 with filter identifiers "1" and "2" in port table 160. Similarly, role 134 of host 122 can be present in the set of destination roles corresponding to filter identifier "1." Hence, switch 103 can associate port 366 of host 122 with filter identifier "1" in port table 160. Since port 364 is not coupled to any host, port 364 is not associated with a filter identifier. Furthermore, if switch 103 detects a new host via a port, switch 103 can determine the role of the new host and associate the port with corresponding filter identifiers.

During operation, host 125 belonging to role 132 can send a multi-destination packet 372, which can be a TCP packet on port 80. Switch 105 can encapsulate packet 372 with a tunnel header to generate encapsulated packet 374. Switch 103 can include role 132 as the source role in the tunnel header and send packet 374 to switch 103. Upon receiving packet 374, switch 103 can determine role 132 as the source role based on the tunnel header and obtain packet 372. Since packet 372 has a source role 132 and is a TCP packet on port 80, switch 103 can determine that packet 372 corresponds to filter identifier "2," as described in conjunction with FIG. 2B. Based on port table 160, switch 103 can determine that filter identifier "2" is mapped to port 162. Accordingly, switch 103 can forward a copy of packet 372 via port 162. This filtering process can be executed in the forwarding hardware of switch 103.

Another host 126 belonging to role 136 can send a multi-destination packet 376, which can be a TCP packet on port 8080. Switch 105 can encapsulate packet 376 with a tunnel header to generate encapsulated packet 378. Switch 103 can include role 136 as the source role in the tunnel header and send packet 378 to switch 103. Upon receiving packet 378, switch 103 can determine role 136 as the source role based on the tunnel header and obtain packet 376. Since packet 376 has a source role 136 and is a TCP packet on port 8080, switch 103 can determine that packet 376 corresponds to filter identifier "1," as described in conjunction with FIG. 2B. Based on port table 160, switch 103 can determine that filter identifier "1" is mapped to ports 162 and 366. Accordingly, switch 103 can forward a copy of packet 376 via ports 162 and 366.

Figure 4A:
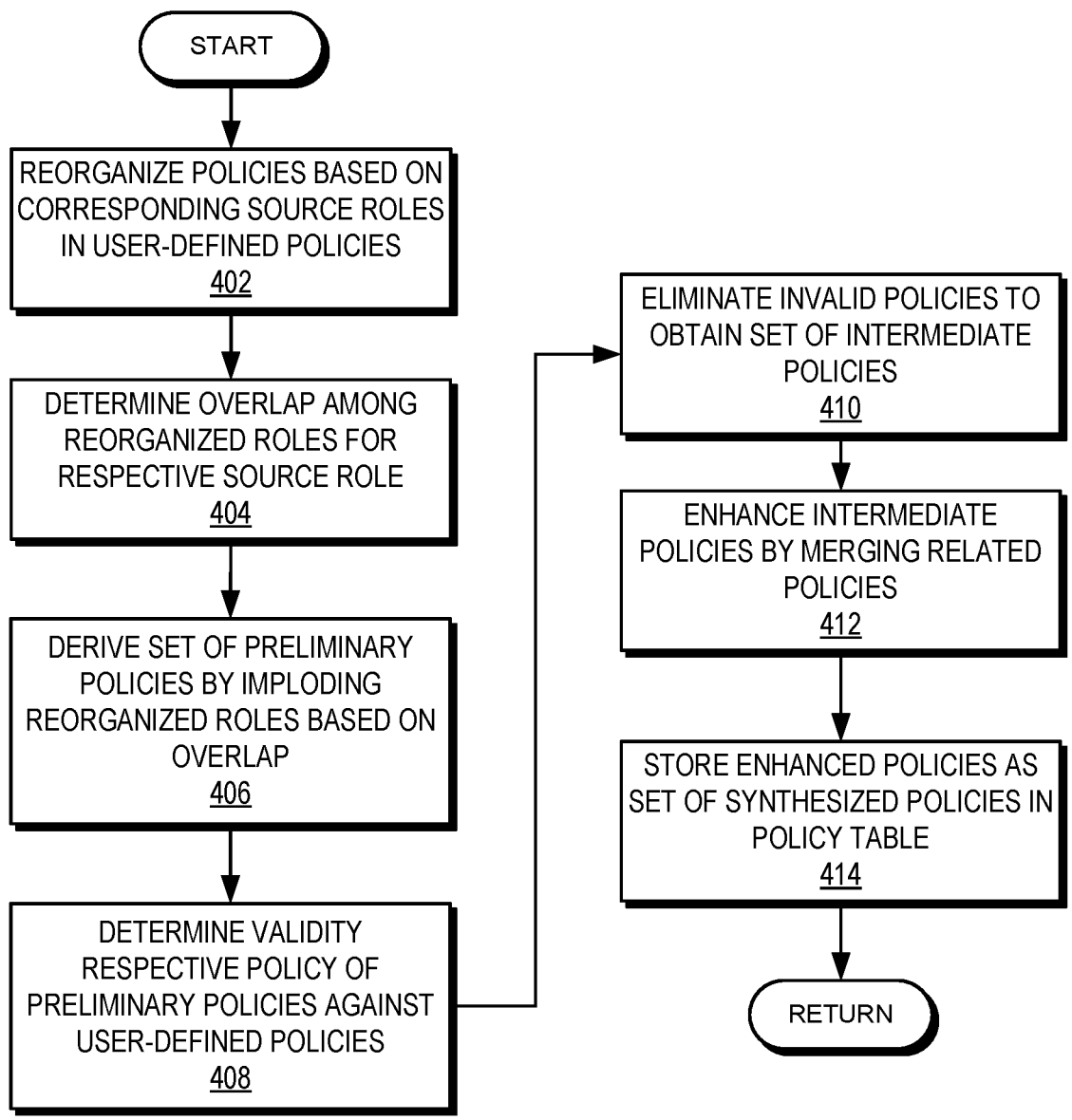
FIG. 4A presents a flowchart illustrating the process of a switch synthesizing policies for multi-destination packets in a distributed tunnel fabric, in accordance with an aspect of the present application.

FIG. 4A presents a flowchart illustrating the process of a switch synthesizing policies for multi-destination packets in a distributed tunnel fabric, in accordance with an aspect of the present application. During operation, the switch can recognize policies based on corresponding source roles in the user-defined policies (operation 402) and determine the overlap among recognized source roles for a respective source role (operation 404). The switch can then derive a set of preliminary policies by imploding the recognized roles based on the overlap (operation 406). Subsequently, the switch can determine the validity of a respective policy of the preliminary policies against the user-defined policies (operation 408). The switch can eliminate the invalid policies to obtain a set of intermediate policies (operation 410) and enhance the intermediate policies by merging related policies (operation 412). The switch can then store the enhanced policies as the set of synchronized policies in the policy table (operation 414).

Figure 4B:
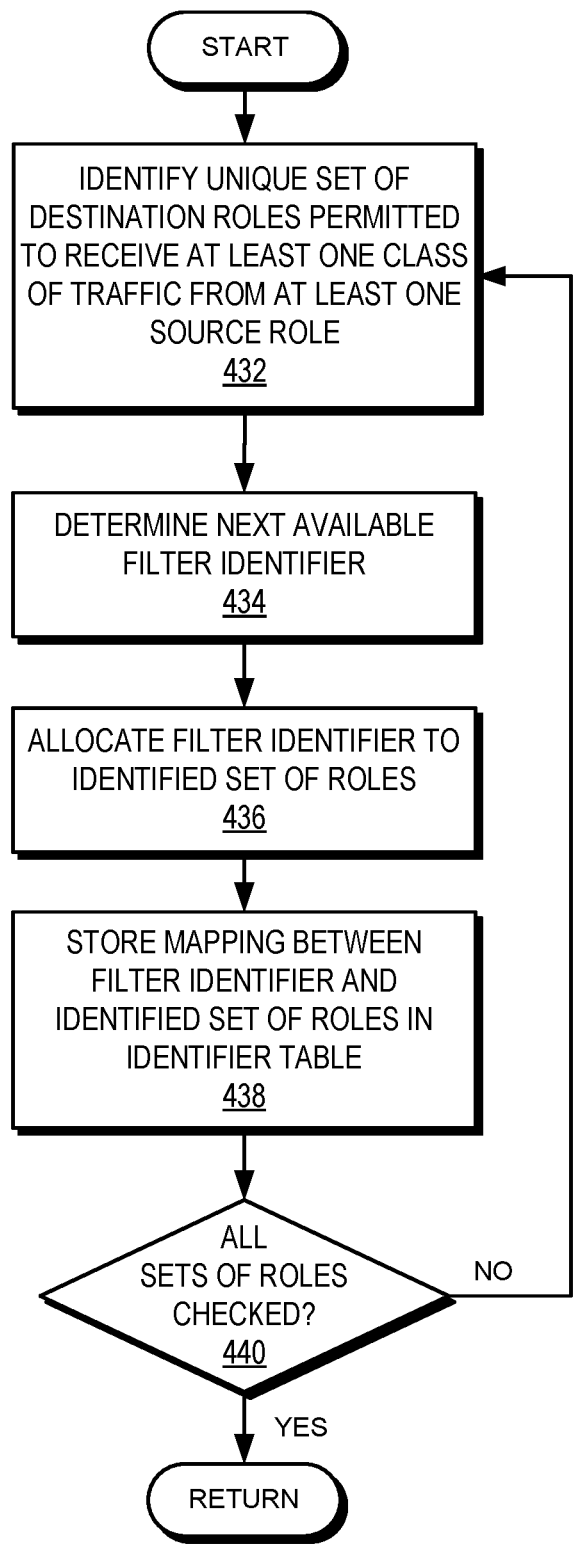
FIG. 4B presents a flowchart illustrating the process of a switch generating filter identifiers for policy enforcement on multi-destination packets in a distributed tunnel fabric, in accordance with an aspect of the present application.

FIG. 4B presents a flowchart illustrating the process of a switch generating filter identifiers for policy enforcement on multi-destination packets in a distributed tunnel fabric, in accordance with an aspect of the present application. During operation, the switch can identify a unique set of destination roles permitted to receive at least one class of traffic from at least one source role (operation 432). The switch can then identify the next available filter identifier (e.g., based on incrementing a positive counter) (operation 434) and allocate the filter identifier to the identified set of roles (operation 436). The switch can store a mapping between the filter identifier and the identified set of roles in an identifier table (operation 438) and determine whether all sets of roles have been checked (operation 440). If all sets of roles have not been checked, the switch can continue to identify the next unique set of destination roles permitted to receive at least one class of traffic from at least one source role (operation 432).

Figure 4C:
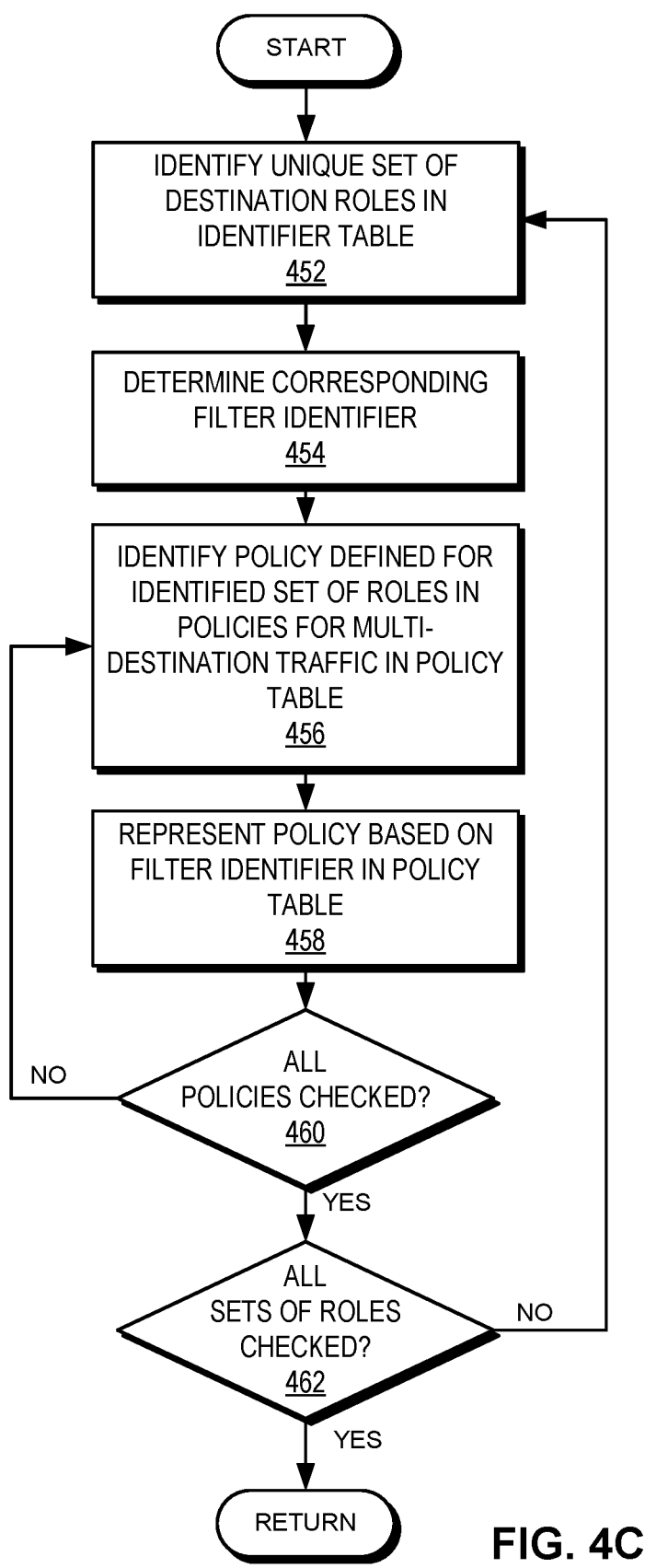
FIG. 4C presents a flowchart illustrating the process of a switch generating policies based on filter identifiers for on multi-destination packets in a distributed tunnel fabric, in accordance with an aspect of the present application.

FIG. 4C presents a flowchart illustrating the process of a switch generating policies based on filter identifiers for on multi-destination packets in a distributed tunnel fabric, in accordance with an aspect of the present application. During operation, the switch can identify a unique set of destination roles in the identifier table (operation 452) and determine the corresponding filter identifier (operation 454). The switch can then identify a policy defined for the identified set of roles in the policies for the multi-destination traffic in the policy table (operation 456). Subsequently, the switch can represent the policy based on the filter identifier in the policy table (operation 458).

The switch can determine whether all policies have been checked (operation 460). If all policies have not been checked, the switch can continue to identify the next policy defined for the identified set of roles in the policies for the multi-destination traffic in the policy table (operation 456). On the other hand, if all policies have been checked, the switch can determine whether all sets of roles have been checked (operation 462). If all policies have not been checked, the switch can continue to identify the next unique set of destination roles in the identifier table (operation 452).

Figure 5A:
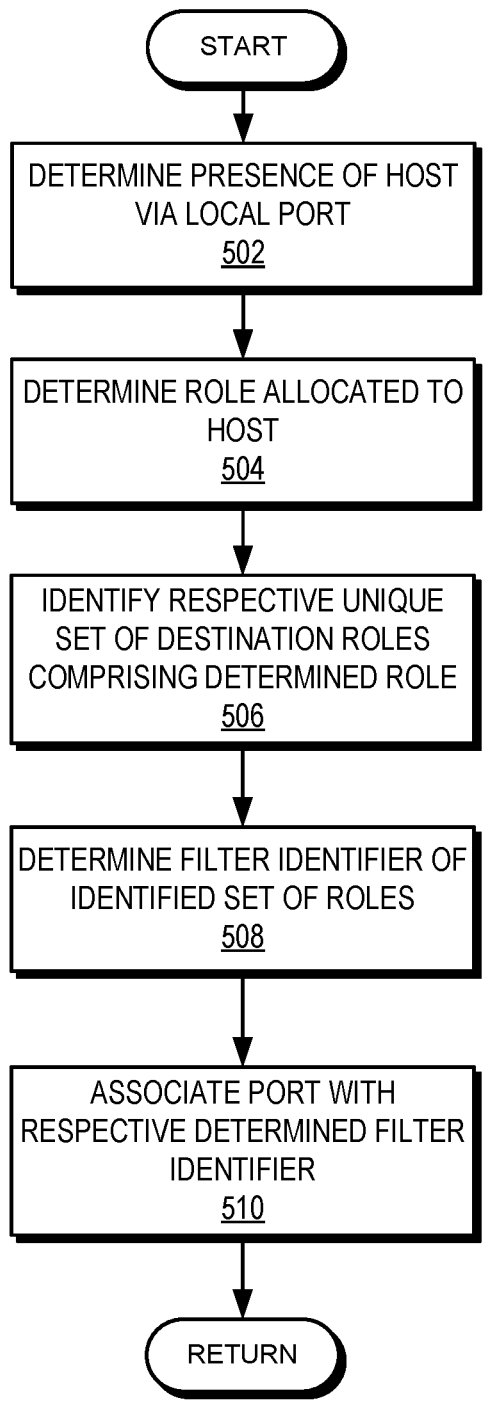
FIG. 5A presents a flowchart illustrating the process of a switch associating a port with filter identifiers for policy enforcement on multi-destination packets in a distributed tunnel fabric, in accordance with an aspect of the present application.

FIG. 5A presents a flowchart illustrating the process of a switch associating a port with filter identifiers for policy enforcement on multi-destination packets in a distributed tunnel fabric, in accordance with an aspect of the present application. During operation, the switch can determine the presence of a host via a local port (i.e., a port of the switch) (operation 502) and determine a role allocated to the host (operation 504). The switch can determine the role based on the authentication information associated with the host. The switch can then identify a respective unique set of destination roles comprising the determined role (operation 506) and determine a filter identifier of the identified set of roles (operation 508). Subsequently, the switch can associate the port with a respective determined filter identifier (operation 510).

Figure 5B:
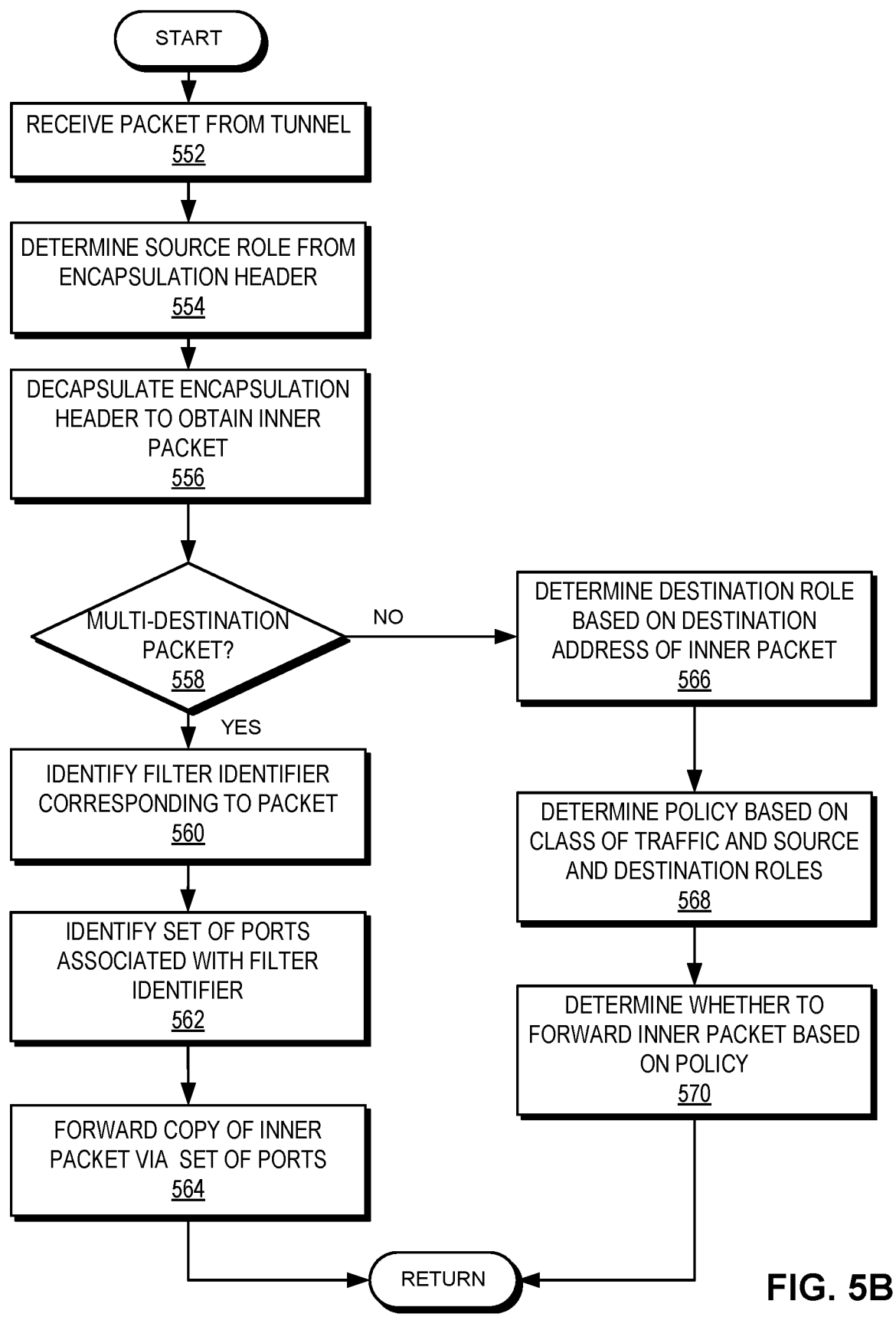
FIG. 5B presents a flowchart illustrating the process of a switch enforcing policies on a multi-destination packet in a distributed tunnel fabric, in accordance with an aspect of the present application.

FIG. 5B presents a flowchart illustrating the process of a switch enforcing policies on a multi-destination packet in a distributed tunnel fabric, in accordance with an aspect of the present application. During operation, the switch can receive a packet from a tunnel (operation 552) and determine a source role from the encapsulation header (operation 554). The switch can then decapsulate the encapsulation header to obtain the inner packet (operation 556) and determine whether the inner packet is a multi-destination packet (operation 558).

If the packet is a multi-destination packet, the switch can identify the filter identifier corresponding to the packet (operation 560). The switch can then identify a set of ports associated with the filter identifier (operation 562) and forward a copy of the inner packet via the set of ports (operation 574). On the other hand, if the packet is not a multi-destination packet, the switch can determine the destination role based on the destination address of the inner packet (operation 566). The switch can then determine a policy based on the class of traffic and the source and destination roles (operation 568) and determine whether to forward the inner packet based on the policy (operation 570).

Figure 6:
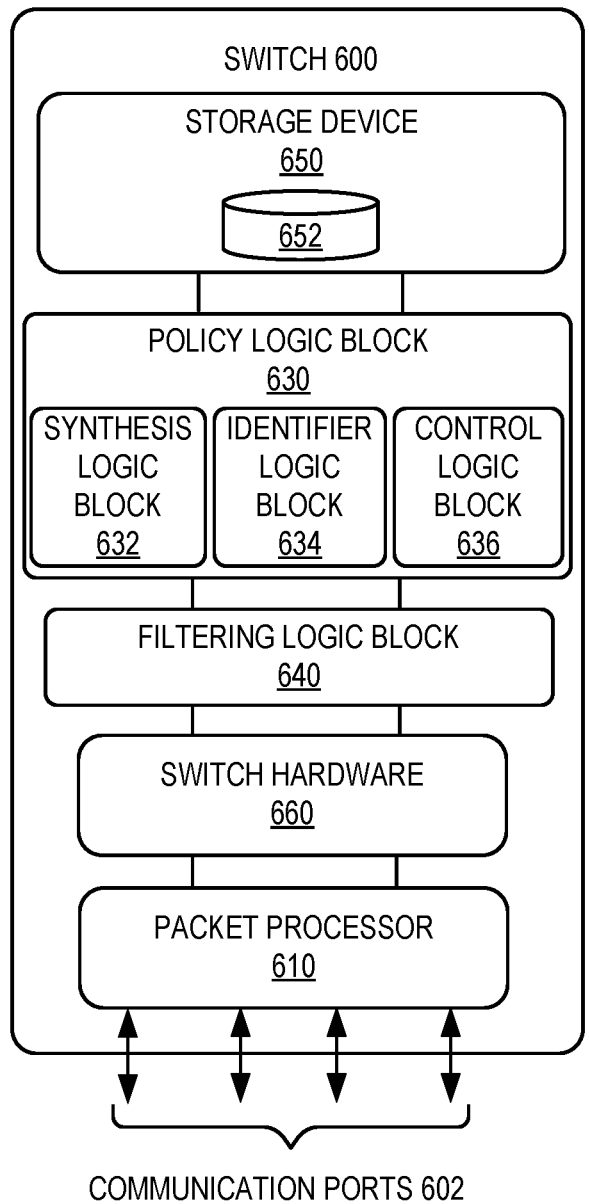
FIG. 6 illustrates an example of a switch supporting efficient policy enforcement on multi-destination packets in a distributed tunnel fabric, in accordance with an aspect of the present application.

FIG. 6 illustrates an example of a switch supporting efficient policy enforcement on multi-destination packets in a distributed tunnel fabric, in accordance with an aspect of the present application. In this example, a switch 600 includes a number of communication ports 602, a packet processor 610, and a storage device 650. Switch 600 can also include switch hardware 660 (e.g., processing hardware of switch 600, such as its ASIC chips), which includes information based on which switch 600 processes packets (e.g., determines output ports for packets). Packet processor 610 extracts and processes header information from the received packets. Packet processor 610 can identify a switch identifier (e.g., a media access control (MAC) address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with a respective VLAN and/or TNI, a multicast group, and a multi-destination address.

Switch 600 can include a policy logic block 630. Policy logic block 630 can include a synthesis logic block 632, an identifier logic block 634, and a control logic block 636. Synthesis logic block 632 can synthesize a new set of GBPs for multi-destination packets from a set of user-defined GBPs. Identifier logic block 634 can generate a filter identifier for a respective unique set of permitted destination roles in the synthesized GBPs. Identifier logic block 634 can then allocate the filter identifier to the unique set of permitted destination roles and maintain the corresponding mapping. Identifier logic block 634 can represent the synthesized GBPs based on the filter identifiers to generate an enhanced set of synthesized GBPs. Control logic block 636 can determine the presence of a host with a role via a local port of switch 600 and associate the port to a respective filter identifier representing the role.

Switch 600 can also include a filtering logic block 640 that can determine which GBPs to filter a packet. Filtering logic block 640 can use the user-defined GBPs to determine whether a known-unicast packet from a source role to a destination role is permitted to be forwarded. On the other hand, filtering logic block 640 can use the synthesized GBPs to determine the set of permitted roles and the corresponding forwarding ports for a multi-destination packet from a source role.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
receiving a first policy defined for a switch, wherein the first policy indicates whether a type of traffic is allowed from a source role of the traffic to a destination role of the traffic via an overlay tunnel associated with the switch;
generating, by the switch, a second policy from the first policy, wherein the second policy specifies a plurality of destination roles that are allowed to receive multi-destination packets of the type of traffic from the source role via the overlay tunnel;
identifying a host associated with a first role at a first port of the switch;
applying the second policy for the multi-destination packets of the type of traffic at the first port by:
determining, by the switch, whether the first role belongs to the plurality of destination roles by comparing the first role with the second policy; and
in response to the first role belonging to the plurality of destination roles, associating the first role with the first port for the type of traffic;
receiving, by the switch, a multi-destination packet associated with the type of traffic via the overlay tunnel; and
allowing the port to forward the multi-destination packet to the host based on the association between the first role and the first port.

2. The method of claim 1, further comprising, in response to the first role not belonging to the plurality of destination roles, precluding the first port from receiving the multi-destination packet by refraining from associating the first role with the first port for the type of traffic.

3. The method of claim 1, further comprising allocating, to the plurality of destination roles, a filter identifier that uniquely identifies the plurality of destination roles in a set of forwarding policies derived by the switch.

4. The method of claim 3, wherein determining whether the first role belongs to the plurality of destination roles further comprises determining whether the first role is associated with the filter identifier.

5. The method of claim 3, further comprising maintaining, in a storage medium of the switch, a data structure that maps the filter identifier to the plurality of destination roles.

6. The method of claim 1, further comprising:
determining whether a packet from the host belongs to multi-destination traffic; and
in response to the packet belonging to multi-destination traffic, determining whether to allow the first port to forward the packet based on the type of traffic.

7. The method of claim 6, wherein, in response to the packet not belonging to multi-destination traffic, determining whether to forward the packet to a destination of the packet based on the first policy.

8. The method of claim 1, further comprising:
determining a source role from a tunnel header encapsulating the multi-destination packet; and
identifying the second policy in a local data structure of the switch based on the source role and the type of traffic.

9. A non-transitory computer-readable storage medium storing instructions that when executed by a computer cause the computer to perform a method, the method comprising:

receiving a first policy defined for a switch, wherein the first policy indicates whether a type of traffic is allowed from a source role of the traffic to a destination role of the traffic via an overlay tunnel associated with the switch;

generating, at the switch, a second policy from the first policy, wherein the second policy specifies a plurality of destination roles that are allowed to receive multi-destination packets of the type of traffic from the source role via the overlay tunnel;

to identifying a host associated with a first role at a first port of the switch;

applying the second policy for the multi-destination packets of the type of traffic at the first port by:
    determining, at the switch, whether the role belongs to the plurality of destination roles by comparing the role with the second policy; and
    in response to the first role belonging to the plurality of destination roles, associating the first role with the first port for the type of traffic;

receiving, at the switch, a multi-destination packet associated with the type of traffic via the overlay tunnel; and allowing the first port to forward the multi-destination packet to the host based on the association between the first role and the first port.

10. The non-transitory computer-readable storage medium of claim 9, wherein the method further comprises, in response to the first role not belonging to the plurality of destination roles, precluding the first port from receiving the multi-destination packet by refraining from associating the first role with the first port for the type of traffic.

11. The non-transitory computer-readable storage medium of claim 9, wherein the method further comprises allocating, to the plurality of destination roles, a filter identifier that uniquely identifies the plurality of destination roles in a set of forwarding policies derived at switch.

12. The non-transitory computer-readable storage medium of claim 11, wherein determining whether the first role belongs to the plurality of destination roles further comprises determining whether the first role is associated with the filter identifier.

13. The non-transitory computer-readable storage medium of claim 11, wherein the method further comprises maintaining, in a storage medium of the switch, a data structure that maps the filter identifier to the plurality of destination roles.

14. The non-transitory computer-readable storage medium of claim 9, wherein the method further comprises:
    determining whether a packet from the host belongs to multi-destination traffic; and
    in response to the packet belonging to multi-destination traffic, determining whether to allow the first port to forward the packet based on the type of traffic.

15. The non-transitory computer-readable storage medium of claim 14, wherein, in response to the packet not belonging to multi-destination traffic, determining whether to forward the packet to a destination of the packet based on the first policy.

16. The non-transitory computer-readable storage medium of claim 9, wherein the method further comprises:
    determining a source role from a tunnel header encapsulating the multi-destination packet; and
    identifying the second policy in a local data structure of the switch based on the source role and the type of traffic.

17. A computer system, comprising:
a processor;
a non-transitory computer-readable storage medium storing instructions, which when executed by the processor causes the processor to perform a method, the method comprising:
    receiving a first policy defined for a computer system, wherein the first policy indicates whether a type of traffic is allowed from a source role of the traffic to a destination role of the traffic via an overlay tunnel associated with the computer system;
    generating, at the computer system, a second policy from the first policy, wherein the second policy specifies a plurality of destination roles that are allowed to receive multi-destination packets of the type of traffic from the source role via the overlay tunnel;
    identifying a host associated with a first role at a first port of the computer system;
    applying the second policy for the multi-destination packets of the type of traffic at the first port by:
        determining whether the first role belongs to the plurality of destination roles by comparing the first role with the second policy; and
        in response to the first role belonging to the plurality of destination roles, associating the first role with the first port for the type of traffic;
    receiving a multi-destination packet associated with the type of traffic via the overlay tunnel; and
    allowing the first port to forward the multi-destination packet to the host based on the association between the first role and the first port.

18. The computer system of claim 17, wherein the method further comprises allocating, to the plurality of destination roles, a filter identifier for that uniquely identifies the plurality of destination roles in a set of forwarding policies derived by the computer system.

19. The computer system of claim 18, wherein determining whether the first role belongs to the plurality of destination roles further comprises determining whether the first role is associated with the filter identifier.

20. The computer system of claim 17, wherein the method further comprises:
    determining whether a packet from the host belongs to multi-destination traffic; and
    in response to the packet belonging to multi-destination traffic, determining whether to allow the first port to forward the packet based on the type of traffic.

\* \* \* \* \*